No. 774,211. PATENTED NOV. 8, 1904.
E. C. TOTTEN.
BRAKE BEAM CLAMP.
APPLICATION FILED AUG. 29, 1904.
NO MODEL.
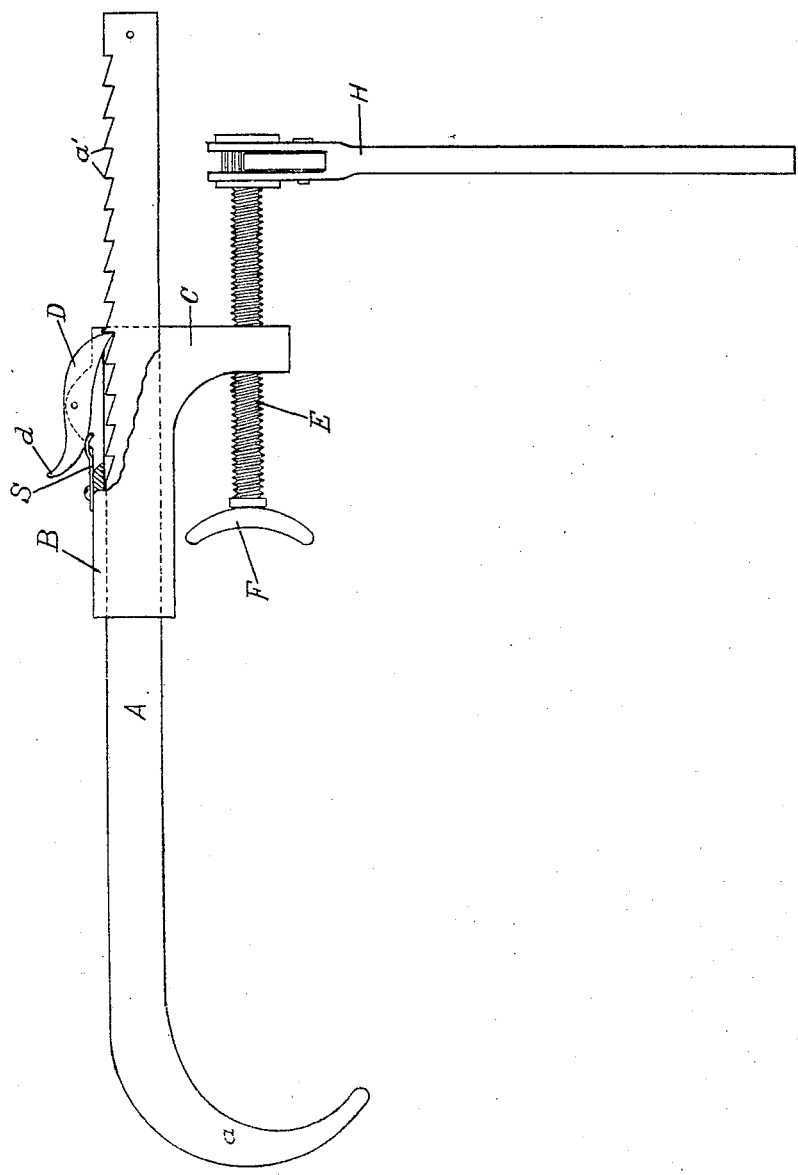
Witnesses
Lottie Prior
Fred. W. Cook
Inventor
Eugene C. Totten
by Ward & Cameron
Attys.

No. 774,211. Patented November 8, 1904.

UNITED STATES PATENT OFFICE.

EUGENE C. TOTTEN, OF ALBANY, NEW YORK.

BRAKE-BEAM CLAMP.

SPECIFICATION forming part of Letters Patent No. 774,211, dated November 8, 1904.

Application filed August 29, 1904. Serial No. 222,507. (No model.)

*To all whom it may concern:*

Be it known that I, EUGENE C. TOTTEN, a citizen of the United States of America, and a resident of the city and county of Albany and State of New York, have invented certain new and useful Improvements in Brake-Beam Clamps, of which the following is a specification.

My invention relates to repair devices for brakes on railway-cars; and the object of my invention is to produce a clamp by which the brake-beam may be moved toward the car-wheels and the brakes firmly set while repairs are being made without the operator going under the axle of the car. I attain this object by means of the mechanism illustrated in the accompanying drawing, which represents a side view of my invention.

A represents a long bar having one end, $a$, in the form of a hook of suitable length and form to be hooked over the axle of a car from under the platform of the car.

B is a sleeve adapted to slide along upon the bar A and having a shoulder C projecting downward. The bar A is provided with teeth $a'$ along a portion of the upper surface, and the sleeve B is provided with a dog D, adapted to catch upon the teeth $a'$.

S is a spring to hold the dog D downward, so that it will be in contact with the teeth $a'$.

$d$ is the thumb-piece attached to or a part of the dog D, by which the dog may be raised from the teeth $a'$ when it is desired to slide the sleeve B in the other direction.

The shoulder C of the sleeve B has a hole provided with screw-threads.

E is a screw adapted to mesh with the screw-threads in the hole in the shoulder C. Upon one end of the screw E is a buffer F and on the other end is a ratchet H, adapted to turn the screw E through the shoulder C.

The use of my brake-beam clamp is as follows: The hook end $a$ of the bar A is hooked over the axle of the car. The sleeve B is moved by hand along the bar A until the buffer F is in contact with the brake-beam, the dog D holding whatever gain is made. The screw E is then worked with the ratchet H and the brakes pressed solidly against the wheels of the car, the dog D holding the gain as fast as it is made, and when the brake is firmly set the repairs can be proceeded with as desired.

The advantages of my invention are that the operator is not required to go under the axle of the car. The whole operation can be performed from under the platform and the brakes quickly set, and by the use of the ratchet can be set as snugly as desired, and when the repairs are finished the brakes can be quickly released and my brake-beam clamp removed.

What I claim as my invention, and desire to secure by Letters Patent, is—

A brake-beam clamp for railway-cars, consisting of a bar having one end in the form of a hook, and with teeth on the upper side of the other end; a sleeve adapted to slide along said bar; a dog attached to said sleeve adapted to work upon and mesh with the teeth upon said bar; a spring adapted to hold said dog upon said teeth; said sleeve also provided with a shoulder having a hole longitudinally through the same provided with screw-threads; a screw adapted to mesh with the screw-threads in said shoulder; a buffer on one end of the said screw and a ratchet on the other end of said screw, substantially as described and for the purposes set forth.

Signed at Albany, New York, this 26th day of August, 1904.

EUGENE C. TOTTEN.

Witnesses:
WALTER E. WARD,
DUDLEY B. WADE